April 8, 1958
A. J. KNAUSS
2,829,480
GAIT REGULATOR FOR A HORSE
Filed Aug. 5, 1955
2 Sheets-Sheet 1
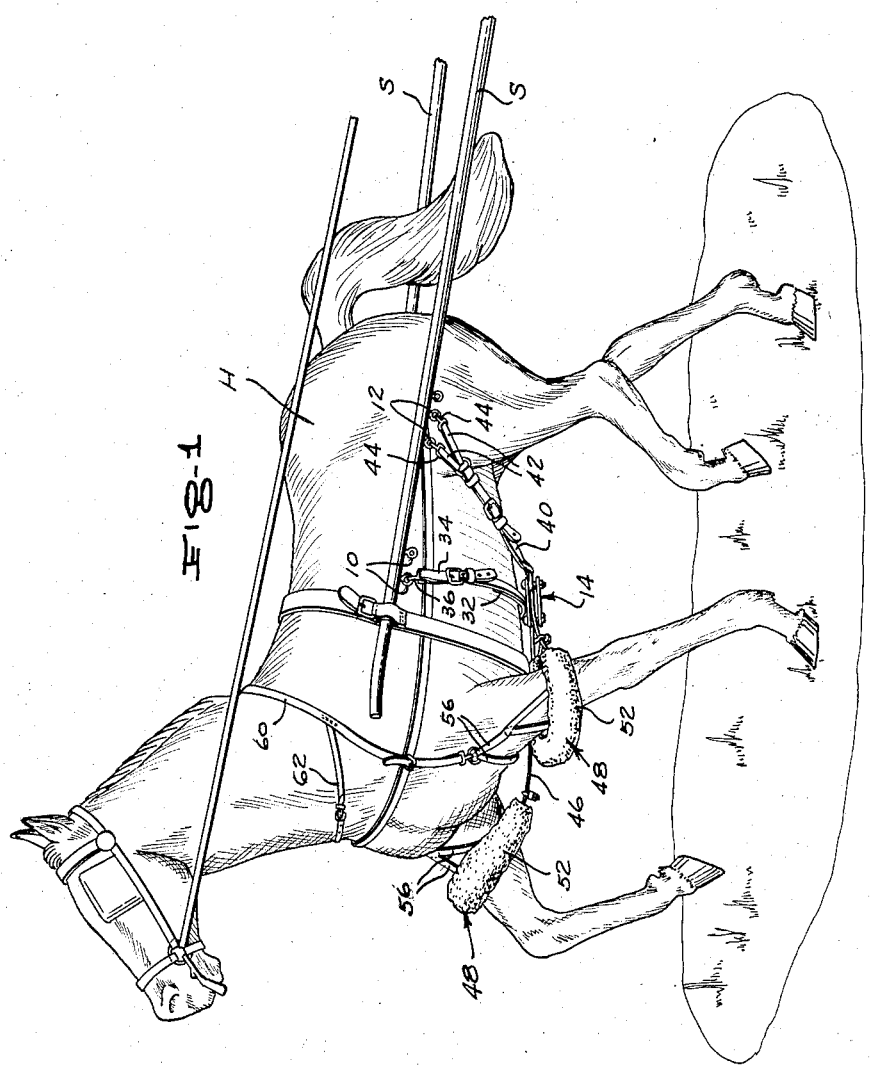
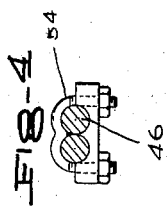
INVENTOR.
ALOIS J. KNAUSS
BY
McMorrow, Berman + Davidson
ATTORNEYS

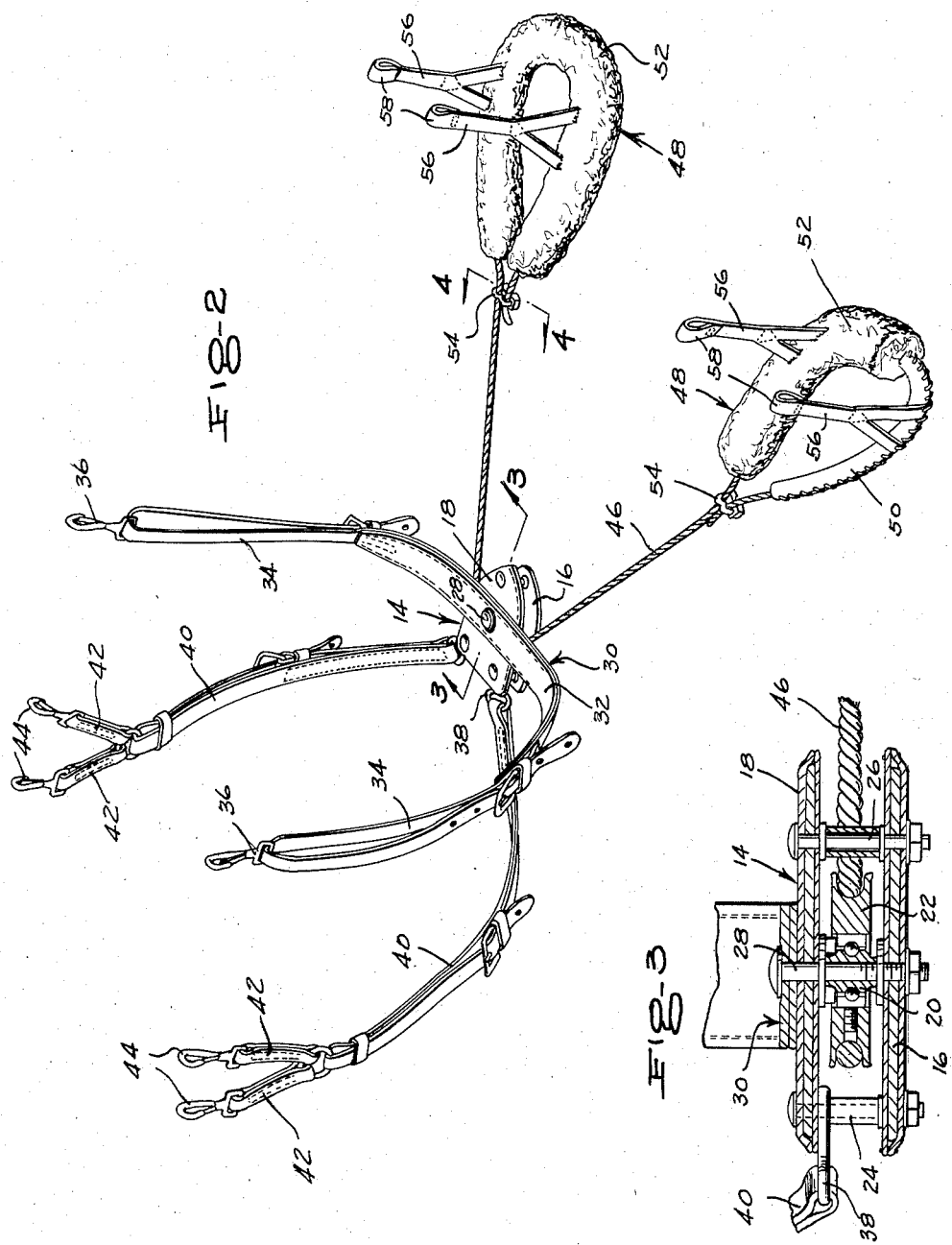

United States Patent Office 2,829,480
Patented Apr. 8, 1958

2,829,480

GAIT REGULATOR FOR A HORSE

Alois J. Knauss, Pottsville, Pa.

Application August 5, 1955, Serial No. 526,685

1 Claim. (Cl. 54—71)

This invention relates to a gait regulator for a horse and has for its primary object to prevent a horse engaged in sulky racing from jumping or breaking into a gallop.

Another object is to facilitate the rapid attachment of the device to the horse and the shafts of the sulky to which the horse is harnessed.

A further object is to avoid injury to the body of the animal while at the same time preventing it from advancing both forefeet forwardly simultaneously.

The above and other objects may be attained by employing this invention which embodies among its features a housing, suspension straps carried by the housing and extending outwardly and upwardly therefrom adjacent opposite sides thereof for attachment to the shafts of the sulky on opposite sides of a horse, a pulley mounted in the housing for rotation about a substantially vertical axis, a cable trained over the pulley and extending forwardly from the housing beneath the body of the horse, and cuffs carried by the cable and encircling the forelegs of the horse adjacent its body.

Other features include restraining straps carried by the housing and extending rearwardly and upwardly from opposite sides thereof, snap hooks carried by the restraining straps remote from the housing for connection to the shafts of the sulky to the rear of the suspension straps, a shoulder strap adapted to extend across the shoulder of the horse, means carried by the cuffs and detachably connected to the shoulder strap for supporting the cuffs on the forelegs of the horse, and a breast strap connected to the shoulder strap and extending across the breast of the horse to hold the shoulder strap in proper position on the horse.

In the drawings:

Figure 1 is a view showing this improved gait regulator or hopple as it would appear when in use;

Figure 2 is a perspective view of the gait regulator or hopple as it would appear when removed from the horse;

Figure 3 is a fragmentary enlarged sectional view taken substantially on the line 3—3 of Figure 2; and Figure 4 is a fragmentary enlarged sectional view taken substantially on the line 4—4 of Figure 2.

Referring to the drawings in detail, a horse H is shown as harnessed to a conventional sulky having shafts S to which are connected longitudinally spaced groups of longitudinally spaced eyes 10 and 12, respectively.

A housing designated generally 14 comprises vertically spaced lower and upper plates 16 and 18 between which is mounted for rotation on a suitable antifriction bearing 20 a pulley 22. The plates 16 and 18 are held in spaced parallel relation by spacers 24 and bolts 26 and the antifriction bearing 20 is carried by a bolt 28 which lies along a substantially vertical axis and extends through the plates 16 and 18, respectively. Secured to the housing 14 and extending transversely across the top plate 18 thereof is a suspension strap designated generally 30 comprising a main body portion 32 carrying adjacent opposite ends adjustable suspension straps 34 upon which are supported for adjustment snap hooks 36 which, as illustrated in Figure 1, are adapted to be connected to selected screw eyes 10 on each sulky shaft S.

Carried by the uppermost plate 18 and extending outwardly and rearwardly therefrom adjacent opposite sides thereof are loops 38 through which are threaded adjustable restraining straps 40 carrying adjacent their ends remote from the housing 14 divergent straps 42 to which are connected rear snap hooks 44. These snap hooks are adapted to engage selected eyes 12 on the shafts S, as will be readily understood upon reference to Figure 1. The straps 40 serve to restrain forward movement of the housing 14 under the influence of the pull exerted thereon by the forelegs of the horse.

Trained over the pulley 22 and extending forwardly therefrom beneath the body of the horse is a cable 46 which is looped adjacent opposite ends and threaded through cuffs designated generally 48, each of which comprises a flexible tube 50 such as sheepskin carrying on its outer side the natural wool 52 which provides a cushion which will prevent injury to the legs of the horse. As illustrated in Figures 2 and 4, the cable 46 is looped adjacent opposite ends and passes through the tubular bodies 50 of the cuffs 48 and is held in looped position by suitable clamps 54 which facilitate the adjustment of the cuffs 48 about the legs of the horse. Carried by the cuffs 48 and extending upwardly therefrom adjacent opposite sides thereof are supporting straps 56 carrying adjacent their upper ends loops 58, the purpose of which will hereinafter appear.

Extending across the shoulder of the horse is a shoulder band or strap 60 which extends downwardly adjacent opposite forelegs of the horse and is connected to the loops 58 of the cuffs 48 to hold the cuffs 48 in proper position on the forelegs of the horse. A breast strap 62 is connected at opposite ends to the shoulder band or strap 60 and extends across the breast of the horse, as illustrated in Figure 1, to prevent the shoulder strap or band 60 from moving rearwardly on the body of the horse.

In use, the device is connected to the shafts S of a sulky to which the horse H has been harnessed and the cuffs 48 are fitted over the forelegs of the horse, as illustrated in Figure 1, while the housing 14 is connected by the suspension straps 32 to the shafts, as illustrated, so that it lies beneath the body of the horse. The restraining straps 40 are then coupled to the shafts by means of the snap hooks 44 and engaging selected eyes 12 and the straps are properly adjusted to the body of the animal. The shoulder strap or band 60 is then placed over the shoulders of the horse and the breast strap 62 is adjusted to hold the shoulder strap or band in the proper position with the cuffs 48 suspended by the straps 56 from the opposite ends of the shoulder band or strap 60. The proper adjustments are made to cause the device to fit the horse upon which it is to be used. Obviously, by the use of the snap hooks 36 and 44, once the proper adjustments have been made, the device may be readily detached from the shafts S and by loosening the coupling of the shoulder band with the straps 56, the entire device may be removed from the horse with but a minimum of effort and within a minimum of time. Owing to the characteristics of horses employed in harness races, it is essential that the device be readily attached to and detached from the horse and the shafts of the sulky.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

In a hopple ring and cable assembly, cable means including a cable having a looped end; a loop-shaped cuff connected to said cable, said cuff comprising a flexible tube through which the looped end extends, said tube being formed of a length of sheepskin carrying on the exterior surface thereof its natural wool, said wool having a high pile so as to form a soft, thick cushion on the tube from end to end thereof; and a pair of retainer strap connectors having portions secured to opposite sides of each cuff and projecting upwardly therefrom through said cushion, said tube having a longitudinal seam facing outwardly of the cuff, each of the connectors being bifurcated to form fork arms thereon, the fork arms of each connector constituting the portions of the connector secured to the tube and having their connections to the tube located at said seam, the cushions extending completely about the tube and having substantial parts of their cross-sectional areas interposed between said fork arms and the open centers of the cuffs.

References Cited in the file of this patent

UNITED STATES PATENTS

| | | |
|---|---|---|
| 472,961 | Cole | Apr. 12, 1892 |
| 556,314 | Keller | Mar. 10, 1896 |
| 589,564 | Jerome | Sept. 7, 1897 |
| 1,088,240 | Richardson | Feb. 24, 1914 |
| 1,130,049 | Welches | Mar. 2, 1915 |
| 2,500,079 | Jackson | Mar. 7, 1950 |
| 2,697,902 | Empie | Dec. 28, 1954 |
| 2,761,266 | Hobkirk | Sept. 4, 1956 |

FOREIGN PATENTS

| | | |
|---|---|---|
| 189,421 | Germany | Sept. 16, 1907 |
| 141,170 | Australia | June 30, 1948 |